Oct. 21, 1958  E. E. BIANCO  2,856,694
MICROMETER CALIPERS, MICROMETER HEADS AND THE LIKE
Filed March 26, 1954  2 Sheets-Sheet 1

INVENTOR
Emilio Ernesto Bianco
BY
attorney

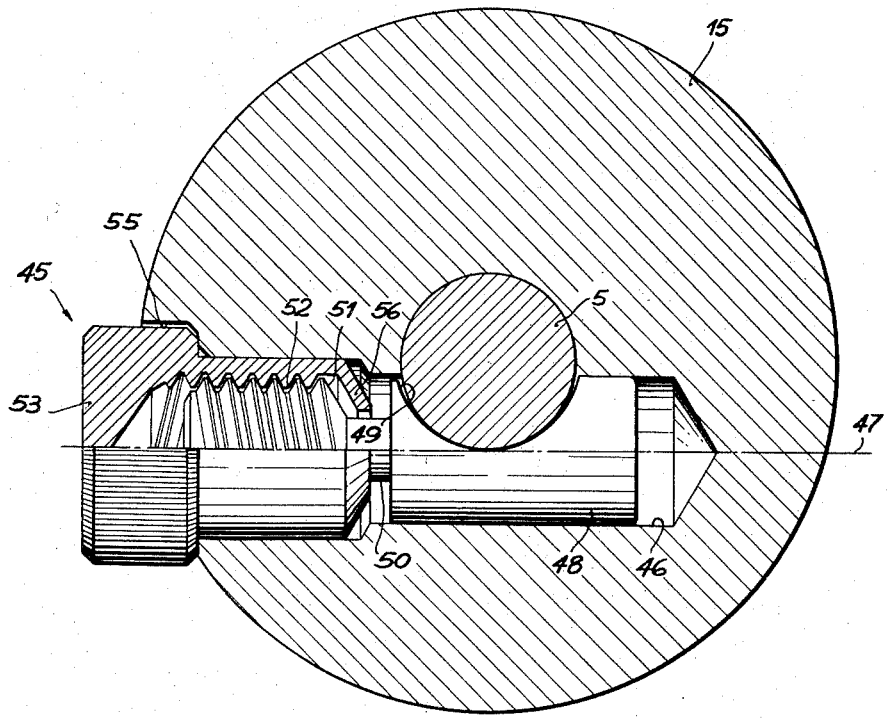

2,856,694

MICROMETER CALIPERS, MICROMETER HEADS AND THE LIKE

Emilio Ernesto Bianco, Buenos Aires, Argentina

Application March 26, 1954, Serial No. 418,843

16 Claims. (Cl. 33—164)

This invention relates to improvements in micrometer calipers as well as in micrometer heads and more particularly it refers to a micrometer head of simple structure and yet of great accuracy.

For the purpose of this specification the expression "micrometer" should be understood as meaning either a micrometer caliper or a micrometer head since the improvements may be equally applied to either of them.

In the known micrometers the adjustment of the scales as well as the periodic control thereof, require a number of extra elements which obviously increase the cost of the micrometer and at the same time the adjustment is a complicated operation.

Another drawback of the known micrometers is that the friction head used for accurate measuring is related to the spindle by means of a number of precision parts, which also increase considerably the manufacturing cost of the instrument.

As to the connection existing between the spindle and the barrel there are several known systems which tend to compensate the wear and tear of the micrometer screw of the spindle; usually a fixed split or master nut and an adjusting nut for thread wear are connected to the barrel mounted on the spindle. One type of wear compensating nut consists in providing an adjusting nut which operates on a conical exterior thread of the fixed split nut, which is a bad mesh due to the difference of inclination of the threads. The wear and tear is quite considerable and the adjustment operation must be repeated quite frequently.

Another system is the so called parallel adjustment, wherein the wear compensating nut is parallely displaced with regard to the micrometer screw and in this system the meshing contact may be either on the crests or the roots of the threads, so that the play between the lateral faces of the threads is often a source of errors which are not easily located.

To the above mentioned drawbacks it has still to be added that, when such a micrometer is disassembled and the spindle has to be screwed again into the nuts, it often happens that due to inexpert handling the threads of the nut are ruined, and foreign particles may easily enter between the threads.

As to the clamping or lock means in the known instruments, several systems are already known of which some are quite satisfactory from the operational view point, such as the clamp rings, but these systems destroy the continuity of the guiding surface for the spindle and furthermore require accurately finished elements, which increase considerably the cost of the instrument.

To avoid this high cost as to the lock means, another proposition consists in providing an eccentric which directly acts on the spindle and which produces the blocking by exerting an axial force on the axis of the spindle, thereby altering the measurement.

Bearing in mind these drawbacks certain and useful improvements have been conceived for micrometer calipers and micrometer heads, comprising a spindle having a micrometer screw portion, a barrel having a first boring having an axis which is common with the longitudinal axis of said barrel, a master nut at least partially located in said first boring and rigidly connected to said barrel, a wear compensating nut also at least partially located in said first boring and elastically connected to said master nut and said barrel, said wear compensating nut pushing said micrometer screw portion parallel to the longitudinal axis thereof and in the backward movement direction of said spindle, said barrel being slidably mounted on said spindle, said master nut and said wear compensating nut being screwed on said micrometer screw portion, lock means in said barrel for locking said barrel on said spindle, a thimble having a second boring having an axis which is common with the longitudinal axis of said thimble, said thimble being mounted on said spindle and at least partially housing said barrel in said second boring, said spindle, barrel and thimble having common axis.

Thus, it is an object of the present invention to provide a micrometer which enables to adjust the thimble with regard to the spindle both angularly as well as even axially up to a certain extent, so that the scale adjustment, or in other words the "zero" adjustment may be easily and simply accomplished, both with regard to the anvil as well as with regard to any other stationary reference point.

Another object is to provide the above mentioned register means insuch a way that the force required for loosening and/or locking the thimble on the spindle will not alter the relationship between the master nut and the micrometer screw of the spindle, nor will it be able to alter the parallelism between the spindle and the thimble, within admissible limits, nor will it produce a relative rotation between the spindle and the master nut.

A still further object is to provide an arrangement by means of which the friction head for fine adjustments is directly mounted on the spindle, using to this effect a rectified diameter portion which also serves as the support of the thimble.

Another object is to provide an arrangement, by means of which the adjustment and blocking means of the thimble with regard to the spindle are accurate, simple, economical and may be operated without requiring any special tool.

It is still a further object of the invention to provide a special structure as to the master nut and wear compensating nut which assures that said nuts are meshing with the micrometer screw in such a way that the contact between the threads is always established on the same side, so that no play will affect the accuracy of the instrument even with the normal wear and tear arising out of use.

Another object is to provide a master nut and wear compensating nut arrangement by means of which the wear and tear is reduced to a minimum due to the large contact surfaces existing between the nuts and the screw.

It is still a further object of the present invention to provide an automatic adjustment between the spindle and the thimble.

A further object is to provide an automatic master nut and wear compensating nut arrangement, which in relationship with the barrel is so arranged that when disassembling the micrometer, the above mentioned arrangement remains connected to and assembled with the barrel and therefore may not be damaged by inexpert operators, nor can any of the integrant elements get lost.

Another object of the present invention resides in providing lock means of simple structure and yet of accurate operation without damaging the spindle.

These and further objects and advantages of the present invention will become more apparent during the course of the following description in which by way of example two embodiments have been shown.

In the drawings:

Fig. 7 is a cross-section similar to Fig. 4 showing the locking means in greater detail.

Figure 1:
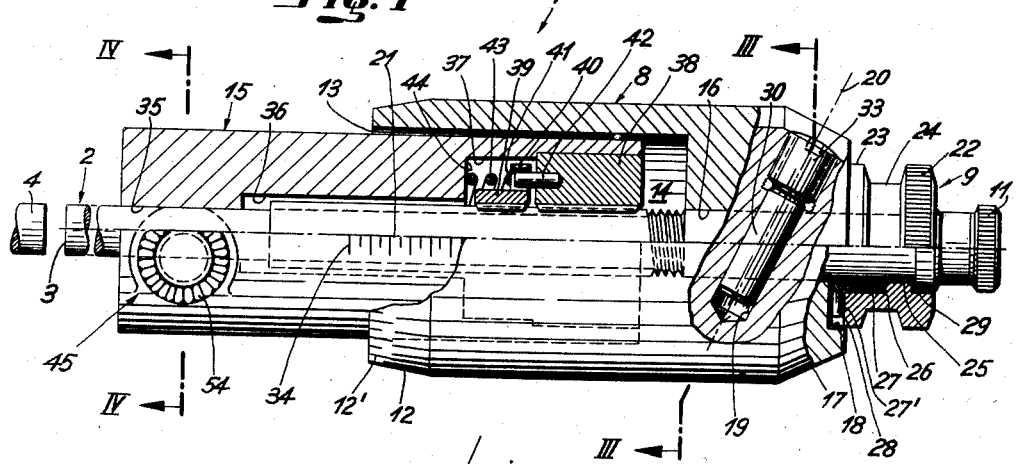
Figure 1 is a side elevation partially in longitudinal section of a micrometer, in accordance with the present invention.
Figure 2:
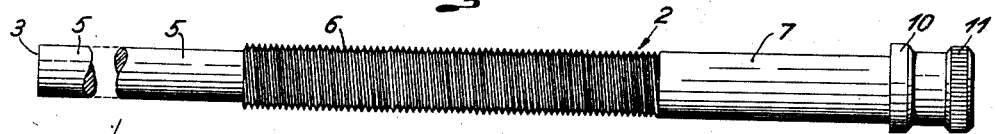
Figure 2 is a side elevation of the spindle with a micrometer screw portion.

As may be appreciated from Figure 1, the micrometer 1 of the present invention comprises a movable spindle 2 (see also Figure 2) having a free end 3 which may enter into contact with an anvil 4 (only partially shown) which may be for instance supported in a frame (not shown) which also supports the micrometer. The spindle 2 comprises in this embodiment a first smooth portion 5 having the above mentioned free end 3, a micrometer screw portion 6, preferably of larger diameter than said first smooth portion 5, a second smooth portion 7 of substantially the same diameter as the outer diameter of the micrometer screw portion 6 and which second smooth portion supports a thimble 8 (see Figure 1) and a friction head 9. A shoulder 10 (see also Figure 2), integral with said second smooth portion 7 limits the length of said second smooth portion and is further connected to a direct driving knob 11 which may also form an integral part of the spindle 2.

It is obvious that although the knob 11 forms an integral part of the spindle 2, the former could be rigidly connected to the latter.

The thimble 8 is of generally cylindrical shape and has a bevelled front end 12, provided with a scale 12' dividing one complete turn of the thimble 8 into equal fractions, as is well known in the art. The thimble 8 further defines by means of a large diameter boring 13, a chamber 14, in which a cylindrical barrel 15 is at least partially housed as is also known in the art.

The thimble 8 furthermore comprises a second boring 16 and which is coaxial with the large diameter boring 13. The thimble 8 further comprises a bevelled rear end 17 having a cylindrical recess 18 having an axis which is common with the longitudinal axis of the thimble 8 and in which the front end of the friction head 9 is partially housed, as will be later seen with more details.

Finally the thimble 8 comprises a third boring 19, the axis 20 of which forms with the axis 21 which is also the longitudinal axis of the thimble 8 and therefore also of the second boring 16, when projected on a plane passing through one of said axes 20 or 21 and being parallel to a plane passing through the other axes 21 or 20, an angle of approximately 60°. This angle may substantially vary between 45° and 90°, according to the circumstances required for which the embodiment is built.

The thimble 8 is smoothly mounted on the spindle 2 and more particularly, the second boring 16 is smoothly mounted on the second smooth portion 7 of the spindle 2 after the friction head 9 has been mounted on the rear end, that is to say the end adjacent to shoulder 10, of said second smooth portion 7.

The friction head 9 consists of a body having an outer rear knurled actuating ring portion 22 and an outer smooth front ring portion 23, separated by an outer cylindrical portion 24 of smaller diameter. This friction head 9 comprises an axial boring 25 which enables to fit said friction head 9 onto the rear portion of the second smooth portion 7 of the spindle 2. Said axial boring 25 is provided in a front end portion with a cylindrical recess 26 in which a helical friction spring 27 is mounted having a free end 27' hooked in a slot 28 whilst the other end freely engages the opposite end of the cylindrical recess 26.

The outer rear knurled actuating ring portion 22 is provided with a cylindrical recess 29 which loosely engages the shoulder 10, so that the friction head cannot be displaced backward towards the direct driving knob 11 of the spindle 2.

The slot 28 and its adjacent portion of the outer smooth front ring portion 23 enter into the cylindrical recess 18 of the bevelled rear end 17 of the thimble 8, wherein it is guided. The slot 28 is thus positioned within the cylindrical recess 29 and cannot be viewed from the outside of the micrometer.

So far it can be understood that for mounting the friction head 9 and thimble 8 on the spindle 2, the friction head 9 is first slid onto the second smooth portion 7, by passing it over the free end 3 of first smooth portion 5, micrometer screw portion 6, until the cylindrical recess 29 engages the shoulder 10. Thereafter a similar process is followed for mounting the thimble 8, to which end the key 30 is first mounted in the third boring 9. Obviously if the shoulder 10 and direct driving knob 11 do not form an integral part with the rest of the spindle 2, the friction head 9 may be mounted from the other end.

Figure 3:
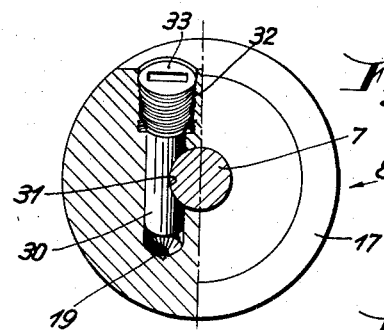
Figure 3 is half a cross section and half a side elevation, according to line III—III of Figure 1.

This key 30 (see Figure 3) is a cylinder having a cylindrical sector cut-out portion 31 so as to be able to enter in contact relationship with the pertinent portion of the second smooth portion 7 of the spindle 2. The upper end portion 32 of boring 19 is of larger diameter and threaded; a pressure screw 33 is screwed in it, so that upon screwing said screw 33 into said upper end portion 32 the key 30 will be axially displaced along axis 20 and thereby a tangential pressure will be exerted on spindle 2 and thus the key 30 will block the thimble 8 on the spindle 2.

It will readily be understood that by loosening pressure screw 33 so as to free key 30, the thimble 8 may be rotated about the spindle 2 and also displaced in small amounts along the longitudinal axis 21; thus the scale 12' of the thimble 8 may be brought into adjustment with the main scale 34 of the barrel 15. As is well known the scale 34 (see Figure 1) of the barrel 15 is divided into units corresponding to the pitch of the micrometer screw 6.

The barrel 15 comprises a first boring having an axis which is common to the longitudinal axis of the spindle and said first boring consists of a front portion 35 smoothly mounted on the first smooth portion 5 of the spindle 2, a middle portion 36 of larger diameter than the front portion 35 and also of larger diameter than the outer diameter of the micrometric screw portion 6 which is partially housed in said middle portion of said first boring and finally a rear portion 37 of still larger diameter than the middle portion 36 and which on its turn comprises two different diameter portions. A master nut 38 is rigidly mounted in said rear portion 37 and screwed onto the micrometer screw portion 6. A wear compensating nut 39 is also screwed onto the micrometer screw portion 6, but is not rigidly connected to the barrel 15; more particularly the wear correcting nut 39 comprises in the embodiment shown a ring 40 with at least one perforation 41 into which a guiding pin 42 projects, mounted in and supported by the master nut 38. A helical spring 43 partially surrounds said wear compensating nut 39 and butts at one end on said ring 40 and at the outer end on the base 44 of the rear portion 37 of the first boring. This arrangement assures that the threads of the micrometer screw portion 6 engage always from the same side the thread of the master nut 38, because the threads of the wear compensating nut 39 will always push the micrometric screw portion 6, in the same direction, thereby even if a certain wear exists, it will not affect the accuracy of the measurement because the pressure is always on the same side face of the threads. Attention must be paid to the fact that the direction of the pushing action of the spring 43 coincides with the direction of the pushing action of the free end 3 so that during the measurement no play may be produced between the threads of the micrometer screw portion 6 and the adjusting nut 38, or in other words that the elastic play will not affect the accuracy of the measurement.

Figure 6:
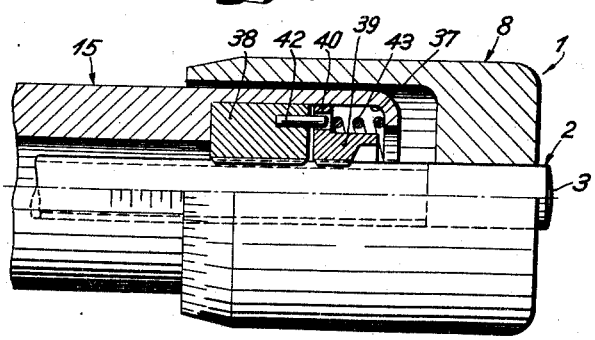
Figure 6 is a side elevation partially in section showing part of a micrometer for internal measurements, to which the master nut and wear compensating nut arrangement, in accordance with the present invention, is applied.

Thus if the above described arrangement is applied to a micrometer for internal measurements, the arrangement must be so inverted that the pushing action of the spring 43 will still coincide with the pushing action of the free end 3 of the spindle 2, as may be seen in Figure 6, wherein the same reference numbers identify similar elements.

So far it has already been explained how the friction head 9 and the thimble 8 are mounted on the spindle 2. After these two elements have been mounted on the spindle 2, the barrel 15 may be mounted thereon, to which end the free end 3 and first smooth portion 5 passes freely through the master nut 38 and wear compensating nut 39, and thereafter said two nuts 38 and 39 are screwed onto the micrometer screw portion 6, as will be later seen, whereupon the barrel 15 gradually enters the large diameter boring 13 until the free end 3 enters in contact with anvil 4, whereupon the "zero" adjustment of the scale 12' of the thimble 8 may be carried out, to which end the pressure screw 33 is loosened, as already previously explained.

Figure 5:
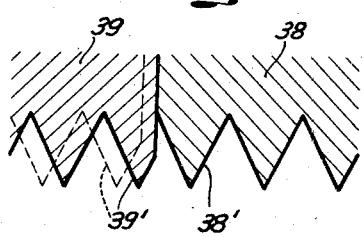
Figure 5 is a schematical detail of the threads of the master nut and wear compensating nut.

In order to cancel eventual play between the side faces of the threads of the micrometer screw portion 6 and wear compensating nut 39, the beginning of the thread 39' of nut 39 is displaced with regard to thread 38' of nut 38, when the two nuts are in contact, as shown in full lines in Figure 5, so that when the micrometer screw portion 6 passes by nut 38 and intends to enter nut 39 it will push said nut 39 against the opposition of spring 43 until, due to the rotation of the spindle 2 the latter will smoothly enter the thread 39', whereby the nut 39 will adopt the dotted position shown in Figure 5, and thus the continuity of the pitch is reestablished, and as soon as the spindle 2 is screwed into the wear compensating nut 39, the latter will perform its "wear compensating" function of the eventual play existing between the threads, as previously explained. In other words, the thread of the wear-compensating nut 39 is so displaced relative to the thread of master nut 38 when the nuts are in contact that when the micrometer screw portion is screwed into the barrel, the wear-compensating nut is automatically spaced from said master nut. Preferably, this is accomplished as shown in Fig. 5 by angularly displacing the end of thread 39' relative to the opposed end of thread 38'. Thus, when the micrometer screw portion is screwed into the barrel, the wear-compensating nut 39 will be automatically spaced from master nut 38 a distance less than the distance of axial movement of the micrometer screw portion upon one rotation thereof.

Figure 4:
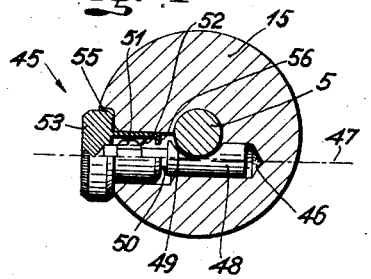
Figure 4 is a cross section along line IV—IV of Figure 1.

The micrometer is also provided with lock means 45 (see also Figures 4 and 7), for locking the spindle 2 with regard to the barrel 15. To this end the barrel 15 comprises a boring 46, the axis 47 of which is approximately tangential to the periphery of the first smooth portion 5 or the corresponding screw portion if the latter should be a screw. A cylindrical lock key 48, having a cylindrical sector cut-out portion 49 in contact with said first smooth portion 5, is located inside said boring 46 and comprises a projection 50 having a screw thread 51 meshing with a nut 52 integral with an actuating knob 53 having a knurled operating outer-face 54 (see Figure 1) and which is maintained in its position due to the circular recess 55. Upon rotating actuating knob 53, the cylindrical stop key 48 is axially displaced and thereby exerts a tangential force on the first smooth portion 5 and locks the spindle 2 with regard to the barrel 15.

If the barrel 15 is dismounted from the spindle 2, the lock means 45 may be withdrawn from the boring 46 and in order to avoid that said lock means 45 as such may be disassembled, the free end of the actuating knob 53 containing the nut 52 is turned inwardly, thereby forming a flange 56 which locks up the projection 50 in the actuating knob 53.

The operation of measuring is already well known in the art and therefore it is considered unnecessary to describe it with regard to the micrometer 1 of the present invention, but it may be added that the direct driving knob 11 enables it to carry out quick displacements whilst the friction head 9 is for limiting the pressure which the free end 3 may exert on the object to be measured, and since the final adjustment is carried out by head 9 the result will always be exact. In fact, by rotating the friction head 9, the helical friction spring 27 is "closed" that its to say its helix is closed and thereby establishes a frictional engagement between the second smooth portion 7 of the spindle 2 and the friction head 9 and thus the former is rotated and will advance with regard to the master nut 38. Thus if the free end 3 enters in contact with work to be measured, even if the friction head 9 is operated, it will not be able to further advance the free end 3, because the frictional engagement of the spring 27 is of such a nature that it cannot transmit more than a very light force of constant value.

I claim:

1. A micrometer comprising a spindle having a micrometer screw portion, a barrel slidably mounted at one end of said spindle and surrounding said micrometer screw portion, means fixedly mounted within said barrel for threaded engagement with said micrometer screw portion and means urging said screw portion in a direction away from the free end of said spindle, a thimble slidably mounted at the opposite end of said spindle and at least partially housing said barrel and means for releasably locking said thimble to said spindle, and means for releasably locking said barrel to said spindle comprising a bore in said barrel, a portion of said bore extending across the space occupied by said spindle, a key in said bore, said key being provided with a cut-out portion for receiving said spindle, an internally threaded nut the forward end of which is provided with an inwardly directed flange, the rear of said key being positioned within said nut and carrying outwardly extending thread-engaging means whereby rotation of said nut will axially displace said key and the rear of said key will be retained within said nut by said flange.

2. A micrometer comprising a spindle having a micrometer screw portion, a barrel slidably mounted at one end of said spindle and surrounding said micrometer screw portion, means fixedly mounted within said barrel for threaded engagement with said micrometer screw portion and means urging said screw portion in a direction away from the free end of said spindle, a thimble slidably mounted at the opposite end of said spindle and at least partially housing said barrel and means for releasably locking said thimble to said spindle, said spindle being provided with a shoulder, a friction head interposed between said shoulder and the rear of said thimble, said friction head having an internal annular recess and a helical spring mounted within said recess, one end of said spring being positioned in a slot at the forward end of said head and the other end of said spring bearing freely against the rear of said annular recess.

3. A micrometer comprising a spindle having a micrometer screw portion, a barrel slidably mounted at one end of said spindle and surrounding said micrometer screw portion, means fixedly mounted within said barrel for threaded engagement with said micrometer screw portion and means urging said screw portion in a direction away from the free end of said spindle, a thimble slidably mounted at the opposite end of said spindle and at least partially housing said barrel and means for releasably locking said thimble to said spindle, said means urging said screw portion comprising a wear-compensating nut adjacent said thread-engaging means, said nut carrying an outwardly extending ring at the end of said nut adjacent said thread-engaging means and a helical spring one end of which bears against said barrel and the other end of which bears against said ring, said helical spring being spaced from the screw portion of said spindle by said nut.

4. A micrometer as recited in claim 3 in which said nut is linked to said thread-engaging means by means of a pin mounted in said thread-engaging means and extending through a perforation in said ring.

5. A micrometer as recited in claim 4 in which the threads of said nut are displaced with regard to the threads of said thread-engaging means when the nut contacts said thread-engaging means so that said nut is pushed against the opposition of said helical spring as said nut is screwed onto the screw portion of said spindle.

6. A micrometer as recited in claim 3 in which said thread-engaging means is constituted by a master nut forced into said barrel.

7. A micrometer comprising a spindle having a micrometer screw portion centrally disposed thereon, a barrel slidably mounted at the free end of said spindle and surrounding said micrometer screw portion, means fixedly mounted within said barrel for threaded engagement with said micrometer screw portion and means urging said screw portion in a direction away from the free end of said spindle, a thimble slidably mounted at the opposite end of said spindle and at least partially housing said barrel, means for releasably locking said thimble to said spindle, a friction head slidably mounted on said spindle, the forward end of said friction head bearing against the rear of said thimble and the rear of said friction head bearing against a shoulder on said spindle, said friction head having an internal annular recess, a helical spring mounted within said recess, one end of said spring being positioned in a slot at the forward end of said head and the other end of said spring bearing freely against the rear of said annular recess.

8. A micrometer comprising a spindle having a micrometer screw portion, a barrel slidably mounted at one end of said spindle and surrounding said micrometer screw portion, means fixedly mounted within said barrel for threaded engagement with said micrometer screw portion, means urging said screw portion in a direction away from the free end of said spindle, said last-named means including resilient means radially spaced from said spindle and threaded wear-compensating means between said resilient means and said screw portion, a thimble slidably mounted at the opposite end of said spindle and at least partially housing said barrel, and means for releasably locking said thimble to said spindle.

9. A micrometer as recited in claim 8 wherein said barrel has a central bore including a forward portion, a middle portion and a rear portion, the forward portion being slidably mounted at said one end of said spindle, the middle portion being of greater diameter than said forward portion and surrounding said screw portion, the rear portion being of greater diameter than said middle portion, said resilient means being mounted in said rear portion.

10. A micrometer comprising a spindle having a micrometer screw portion, a barrel slidably mounted at one end of said spindle and surrounding said micrometer screw portion, means mounted within said barrel for threaded engagement with said micrometer screw portion, a thimble mounted at the opposite end of said spindle and at least partially housing said barrel, and means for releasably locking said barrel to said spindle comprising a bore in said barrel, a portion of said bore extending across the space occupied by said spindle, a key in said bore, said key being provided with a cut-out portion for receiving said spindle, an internally threaded nut the forward end of which is provided with an inwardly directed flange, the rear of said key being positioned within said nut and carrying outwardly extending thread-engaging means whereby rotation of said nut will axially displace said key and the rear of said key will be retained within said nut by said flange.

11. A micrometer comprising a spindle having a micrometer screw portion, a barrel slidably mounted at one end of said spindle and surrounding said micrometer screw portion, means mounted within said barrel for threaded engagement with said micrometer screw portion, and means urging said screw portion in a direction away from the free end of said spindle, said last-named means comprising a wear-compensating nut adjacent said thread-engaging means, said nut carrying an outwardly extending ring at the end of said nut adjacent said thread-engaging means and a helical spring one end of which bears against said barrel and the other end of which bears against said ring, said helical spring being spaced from the screw portion of said spindle by said nut, and a thimble mounted at the opposite end of said spindle and at least partially housing said barrel.

12. A micrometer comprising a spindle having a micrometer screw portion, a barrel slidably mounted at one end of said spindle and surrounding said micrometer screw portion, means mounted within said barrel for threaded engagement with said micrometer screw portion, a thimble mounted at the opposite end of said spindle, said spindle having a shoulder, a friction head interposed between said shoulder and the rear of said thimble, said friction head having an internal annular recess, a helical spring mounted within said recess, one end of said spring being positioned in a slot at the forward end of said head and the other end of said spring bearing freely against the rear of said annular recess.

13. A micrometer comprising a spindle having a micrometer screw portion, a barrel slidably mounted at one end of said spindle and surrounding said micrometer screw portion, a master nut having an internal thread, said master nut being fixedly mounted within said barrel for threaded engagement with said micrometer screw portion, a slidably mounted wear-compensating nut having an internal thread for threaded engagement with said micrometer screw portion, said wear-compensating nut being unrotatably mounted relative to said master nut, means urging said wear-compensating nut toward said master nut, the thread of the wear-compensating nut being displaced relative to the thread of the master nut when the nuts are in contact so that when the micrometer screw portion is screwed into the barrel, the wear-compensating nut will be automatically spaced from said master nut, a thimble slidably mounted at the opposite end of said spindle and at least partially housing said barrel, and means for releasably locking said thimble to said spindle.

14. A micrometer comprising a spindle having a micrometer screw portion, a barrel slidably mounted at one end of said spindle and surrounding said micrometer screw portion, a master nut having an internal thread, said master nut being fixedly mounted within said barrel for threaded engagement with said micrometer screw portion, a slidably mounted wear-compensating nut having an internal thread for threaded engagement with said micrometer screw portion, said wear-compensating nut being unrotatably mounted relative to said master nut, means urging said wear-compensating nut toward said master nut, an end of the thread of said wear-compensating nut being opposed to and angularly displaced from an end of the thread of said master nut so that when said micrometer screw portion is screwed into said barrel, said wear-compensating nut will automatically be spaced from said master nut a distance less than the distance of axial movement of the micrometer screw portion upon one rotation thereof, a thimble slidably mounted at the opposite end of said spindle and at least partially housing said barrel, and means for releasably locking said thimble to said spindle.

15. A micrometer comprising a spindle having a micrometer screw portion, a barrel slidably mounted at one end of said spindle and surrounding said micrometer screw portion, means permanently mounted within said barrel for threaded engagement with said micrometer screw portion, means urging said screw portion in a direction away from the free end of said spindle, a thimble slidably mounted at the opposite end of said spindle and at least partially housing said barrel, said thimble being axially adjustable on said spindle, and means for releasably locking said thimble to said spindle, said screw portion being centrally positioned along said spindle, the portions of said spindle surrounding said screw portion being smooth, the free end of said spindle being of smaller diameter than said screw portion, said means for releasably locking said thimble to said spindle comprising a bore in said thimble, a portion of said bore extending across the space occupied by said spindle, a key in said bore, said key being provided with a cut-out portion for receiving said spindle, and a pressure screw in threaded engagement with the thimble to displace said key along the length of said bore to fix said thimble with respect to said spindle.

16. A micrometer comprising, a spindle having a micrometer screw portion centrally disposed thereon, a barrel slidably mounted at the free end of said spindle and surrounding said micrometer screw portion, means fixedly mounted within said barrel for threaded engagement with said micrometer screw portion and means urging said screw portion in a direction away from the free end of said spindle, a thimble slidably mounted at the opposite end of said spindle and at least partially housing said barrel, means for releasably locking said thimble to said spindle, a friction head slidably mounted on said spindle, the forward end of said friction head bearing against the rear of said thimble and the rear of said friction head bearing against a shoulder of said spindle, said spindle including two smooth portions one on each side of said micrometer screw portion, said smooth portion at the thimble end of said spindle having a diameter at least equal to the maximum diameter of said micrometer screw portion and said micrometer screw portion having a diameter which is larger than the diameter of the smooth portion on the free end of said spindle, said barrel having a central bore including a forward portion, a middle portion, and a rear portion, the forward portion being slidably mounted at one end of said spindle, the middle portion being of greater diameter than said forward portion and surrounding said screw portion, the rear portion being of greater diameter than said middle portion, said resilient means being mounted in said rear portion.

References Cited in the file of this patent
UNITED STATES PATENTS

| | | |
|---|---|---|
| 141,915 | Bonnaz | Aug. 19, 1873 |
| 350,513 | Washburn | Oct. 12, 1886 |
| 448,089 | Starrett | Mar. 11, 1891 |
| 1,533,787 | Crescio | Apr. 14, 1925 |
| 1,940,475 | Witchger et al. | Dec. 19, 1933 |
| 2,546,388 | Collins | Mar. 27, 1951 |

FOREIGN PATENTS

| | | |
|---|---|---|
| 39,707 | Sweden | Dec. 1, 1915 |
| 135,051 | Great Britain | Nov. 20, 1919 |
| 538,427 | France | Mar. 18, 1922 |
| 47,355 | Sweden | July 14, 1920 |
| 139,481 | Sweden | Mar. 10, 1953 |